United States Patent [19]

Lepek

[11] Patent Number: 5,273,296
[45] Date of Patent: Dec. 28, 1993

[54] OBSTACLE OVERCOMING VEHICLE SUSPENSION SYSTEM

[76] Inventor: Alexander Lepek, 14b Moshe Sharet Blvd., Jerusalem, Israel, 96920

[21] Appl. No.: 851,685

[22] Filed: Mar. 12, 1992

[30] Foreign Application Priority Data

Nov. 7, 1991 [IL] Israel .................................. 099990

[51] Int. Cl.⁵ .............................................. B62B 5/02
[52] U.S. Cl. .................................. 280/5.2; 280/5.28; 180/8.2; 305/1
[58] Field of Search ............... 180/8.3, 8.2, 7.1; 305/2, 1; 280/5.2, 5.28, 28.5, 47.23

[56] References Cited

U.S. PATENT DOCUMENTS

| | | | |
|---|---|---|---|
| 1,887,427 | 11/1932 | Porcello | 280/5.28 |
| 2,400,824 | 5/1946 | Jackson | 305/1 |
| 2,633,363 | 3/1953 | Marshall | 305/1 |
| 2,742,973 | 4/1956 | Johannesen | 305/1 |
| 3,515,401 | 6/1970 | Gross | 180/8.2 |
| 4,457,526 | 7/1984 | Persson | 305/1 |

Primary Examiner—Margaret A. Focarino
Assistant Examiner—Kevin Hurley
Attorney, Agent, or Firm—Jacobson, Price, Holman & Stern

[57] ABSTRACT

A suspension for propelling a vehicle so as to overcome an obstruction in its desired path of progress. The suspension includes connections between the chassis and body of the vehicle with its wheels or wheel like elements. A cam guides the rollers to overcome obstructions in the vehicle's path.

5 Claims, 4 Drawing Sheets

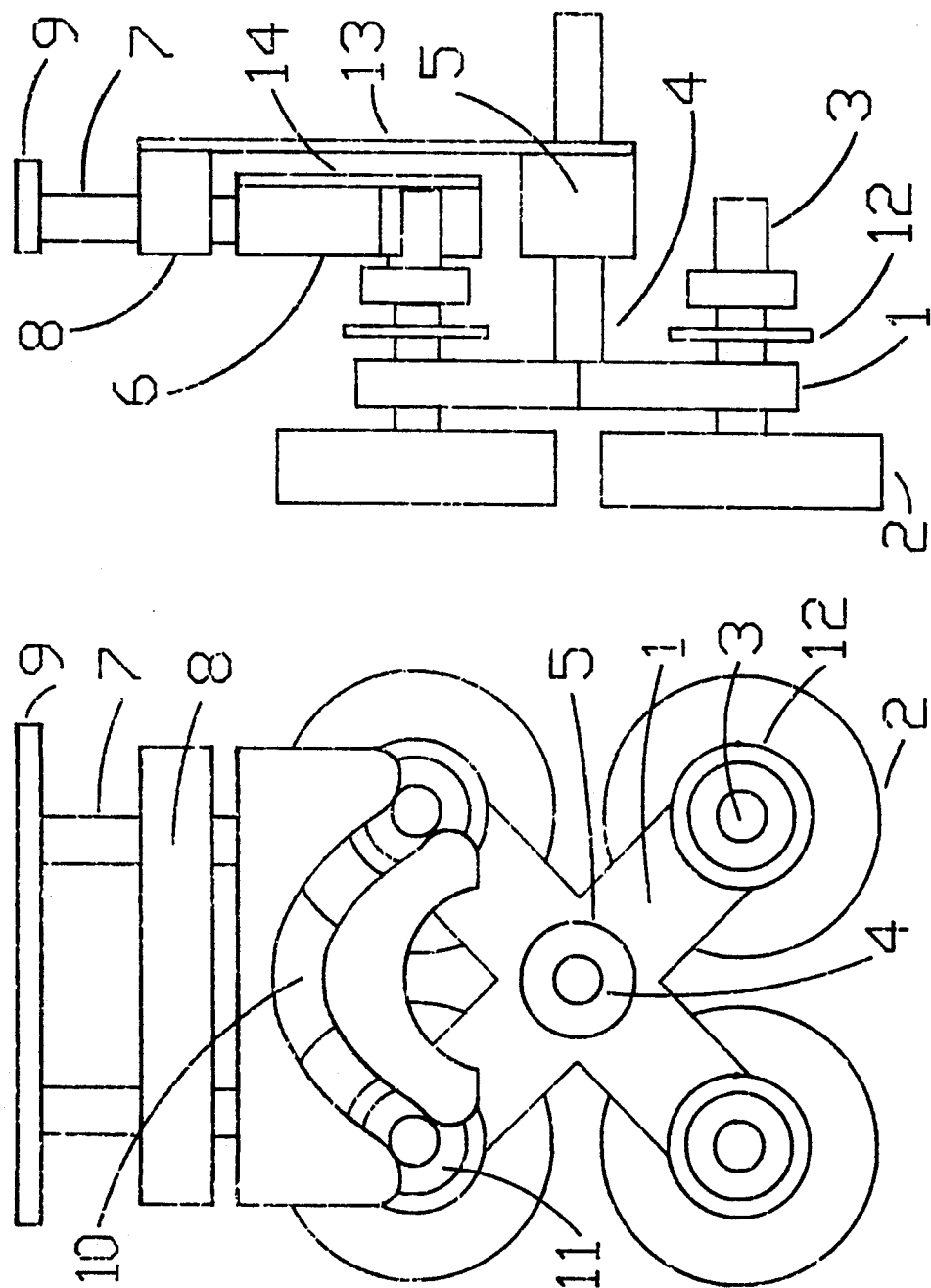

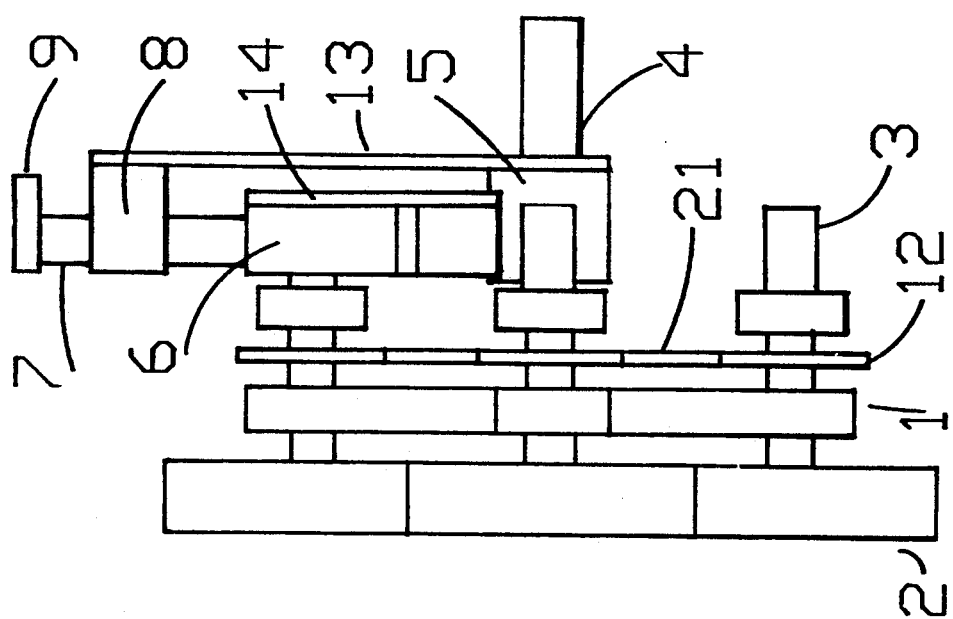
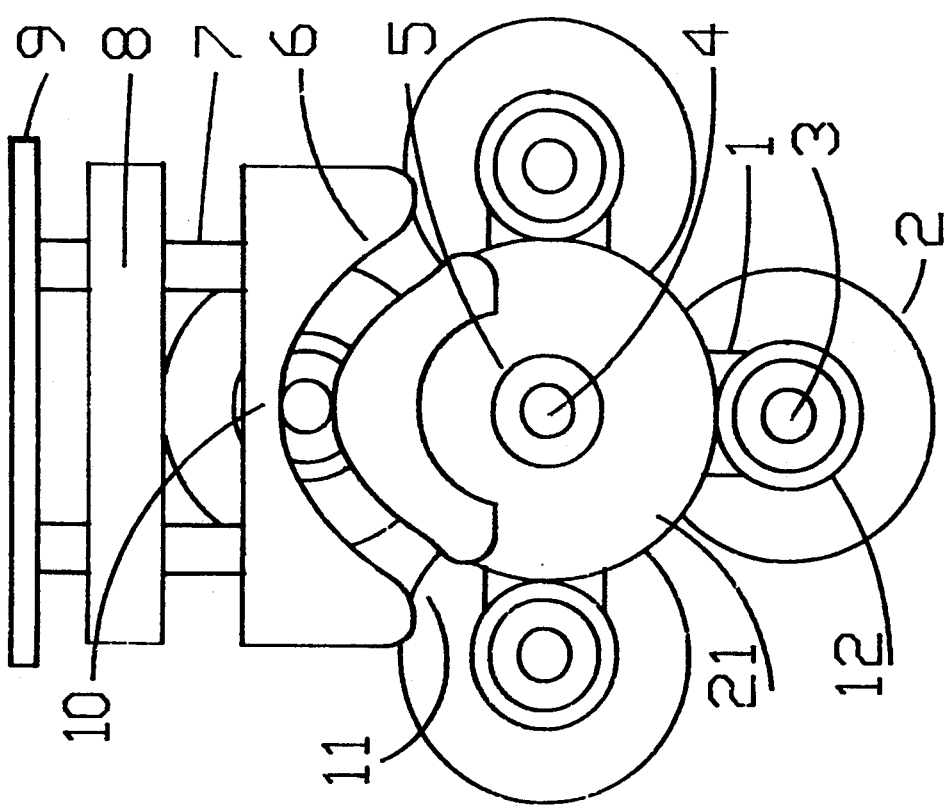

OBSTACLE OVERCOMING VEHICLE SUSPENSION SYSTEM

FIELD OF THE INVENTION

The invention relates to a suspension system for vehicles. The invention further relates to a specific type of suspension which provides for easy motion of the vehicle over obstacles, easy motion through rough terrains or easy climbing on stairs and curbs.

The invention is applicable and intended for use in motorized vehicles, towed vehicles, man powered vehicles and robots. Typical applications are hand truck, All terrain recreation car, rescue vehicle, amphibian vehicle, walking robot suspension, wheelchair etc.

OBJECT OF THE INVENTION

It is the main object of the invention to provide an arrangement which would adapt a vehicle to be driven over possible obstructions in the coveted path of its progress, such as boulders on a driveway or in an unpaved area, or steps leading to built up premises to which a preambulator or stroller—with or without an infant—is being pushed.

The above object and further object will become clearer from the following description.

SHORT SUMMARY OF THE INVENTION

According to the invention, several rollers are evenly mounted on a member, each at the same distance from the said member's center. Each roller may rotate about an axis of rotation through its center. The said member rotates about an axis of rotation through its center.

A possible design of the said member is to comprise several spokes, each said roller being mounted on one spoke. Thus the said member will be referred to as the "spoke system". According to preferred designs, a spoke system has four or three spokes. The suspension system further comprises a cam body, defining a path for the rollers, and at least one roller is engaged in the said cam body at any time, different rollers are engaged when the spoke system rotates.

When the vehicle moves by rotation of the spoke system, the spoke system axis of rotation is displaced up and down (and also moves to the direction of the vehicle's motion). When a roller moves through the cam body, the cam body is forced and restrained to be displaced, with respect to the spoke system axis of rotation, up or down. Despite this relative displacement, the cam body is designed that it will be at almost constant elevation from the ground at any time. The weight of the vehicle is carried by this cam body. Therefore, if the vehicle is moving by such a rotation of the spokes, it experiences minimal vertical displacement from ground.

According to a preferred design, a wheel is mounted on each spoke to enable rolling of the suspension system on the wheels. In different designs, the rollers themselves may or may not act as wheels.

A vehicle may be equipped with one or more suspension systems according to this invention. The invention is applicable and intended for use in motorized vehicles, towed vehicles, man powered vehicles and robots.

A vehicle equipped with suspensions according to this invention, may have several modes of motion which depend on the pattern of the vehicle's route and whether the spokes are equipped with wheels or not.

When the path is smooth, each suspension system may roll on one or two wheels, as in normal wheeled vehicle motion. If the wheels are not mounted then the vehicle may move by rotation of the spoke system, the cam body keeping the vehicle at almost constant elevation from the ground.

When encountering an obstacle which stops the rolling wheel, the spoke system will rotate and pass the obstacle from above, the vertical movement of the vehicle's center of gravity being smaller than in the case of rolling on a wheel.

When encountering a stair, the spoke system will roll around the stair edge.

When moving through muddy or sandy terrains the, rolling of the spoke system may have a paddling action, thus facilitating the vehicle's motion.

The present invention will become more readily apparent when reference is made to the following description taken in conjunction with the accompanying drawings.

BRIEF DESCRIPTION OF THE DRAWINGS

FIG. 1 is a schematic drawing of a suspension system according to the present invention, (having four spokes);

FIG. 1A is a lateral projection of the drawing of FIG. 1;

FIG. 2A is a schematic drawing of a suspension system according to this invention, having a power wheel for driving the wheels;

FIG. 2 is a front projection of the drawing of FIG. 2A;

DETAILED DESCRIPTION OF THE DRAWINGS

Figure 3:
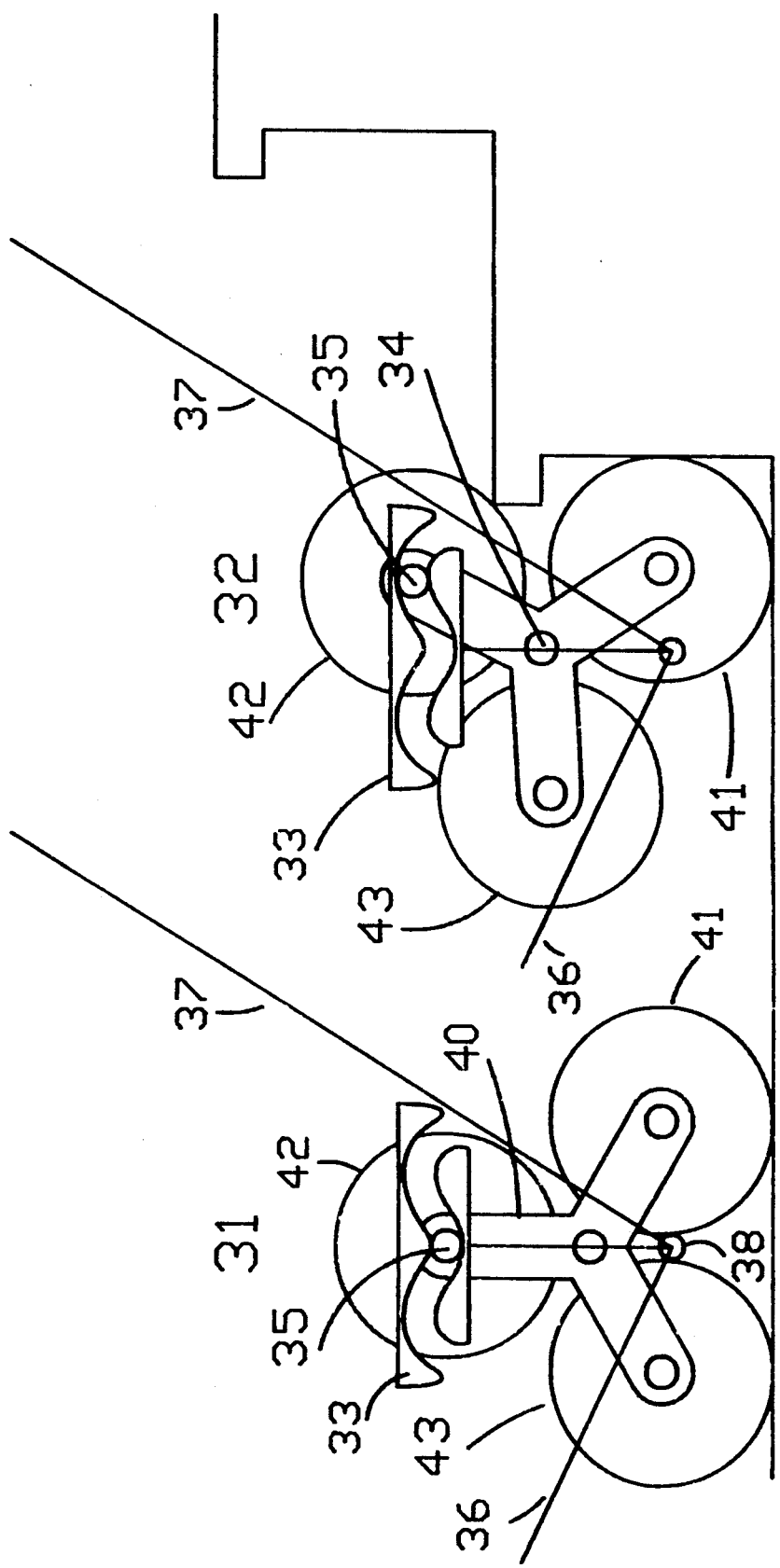
FIG. 3 is a side view of a motion of a hand truck, having two, three spoke, suspension systems according to this invention, just before encountering a staircase.

FIGS. 1 and 1A illustrate a suspension system according to the present invention, having four spokes. In FIG. 1 components 13 and 14 are removed for clarity. In this specific instance of the invention, each spoke 1 is equipped with a wheel 2 and a roller 3. The spoke system may rotate around an axis of shaft 4 supported by bearing member 5.

When the spoke system rotates around the axis of shaft 4, the rollers engage and leave a cam shaped path in a can body 6. Component 14 connects the upper and lower parts of the cam body. At least one roller is always engaged in the cam body 6. Two rollers are engaged in the cam body only when they are at its ends as shown in FIG. 1.

When a roller rolls in the cam body 6, the distance of the cam body 6 from the axis of shaft 4 changes. The movement of the cam body 6 is restrained to a vertical movement only. To this end, the cam body 6 is equipped with slide bars 7 which may slide through fitted guides 8 which are connected to the bearing member 5 by means of bridging body part 13, thus restraining the movement of the cam body to vertical displacement. The main mass of the vehicle is loaded on the cam body through part 9. The can body 6 may be designed so that the changes of its elevation from ground, when the spoke system rotates about axis 4, be practically negligible, thus minimizing the force needed to accomplish a vehicle motion by means of the spoke system rotation.

A reference will be made to such a cam body as a constant elevation cam body. A constant elevation cam body design depends on the number of spokes, the roller's diameter, the length of the spokes and the distance of the rollers from the axis 4 of shaft. The design of a constant elevation cam body may be accomplished graphically by drawing a series of spokes with their rollers, rotated about the axis 4 of shaft and for each such drawing to add a drawing of the cam body moved horizontally with the axis of shaft 4. The resulting graphic trace of the rollers on the cam body is the can body path.

For some applications, in which the suspension system should be supported on one wheel, (such as for better maneuverability) the vertical distance between the central portion 10 of the cam body and its side portion 11 may be higher then in a constant elevation cam body. In this way the four spoke system will be more stable with respect to a rotation about axis 4 when supported on one wheel.

FIGS. 2 and 2A show a powered suspension system according to this invention, having four spokes, at an instance of rolling on one wheel. In FIG. 2, bridging body parts 13 and 14 are removed for clarity. It may be noted that in comparison to FIG. 1, the cam body 6 did not change its elevation from ground, though it moved with respect to the guides 8.

Each of the wheels 2 may be powered, braked and controlled separately from the spoke system, by using the drive wheels 12 which are rigidly connected to the wheels 2. The spoke system may be powered, braked, controlled or fixed in a specific angle (such as in FIG. 2) by driving the axis of shaft 4.

In FIG. 2, a power wheel 21, concentric with the axis of shaft 4, engaged with and controlling all drive wheels 12 simultaneously, is illustrated.

FIG. 3 illustrates a side view motion of a hand truck, equipped with two three spoke suspension system according to this invention, just before encountering a staircase. Here, only the spoke system and the cam body are shown. The truck 36 and the handle 37 are connected together and free to rotate about axis 38 which is connected to the cam body 33. When moving on a smooth path the suspension system may be in any position. One such position 31 is illustrated in this drawing. In this position 31 the system moves on wheels 41 and 43 and the can body 33 is supported by the roller 35 being on the same spoke 40 as the wheel 42.

When a vehicle equipped with this suspension is towed (to the right in this drawing) towards the stairs and wheel 41 cannot move any more, the spokes will rotate about an axis of shaft 34 entering position 32. Further towing will further rotate the system which will roll on wheels 42 and 41 around the edge of the stair.

This drawing is roughly drawn to scale, showing a stair 17.5 cm high. This suspension system can park on a stair being less then 23 cm wide. In this specific design the radius of the wheels (41, 42 and 43) is 7 cm and the spoke length is 9 cm. The cam body decreases the vertical motion of the vehicle (because of a possible spoke system rotation on a horizontal road) from 4.5 cm without a cam body to less than 0.5 cm with the cam body.

Figure 4:
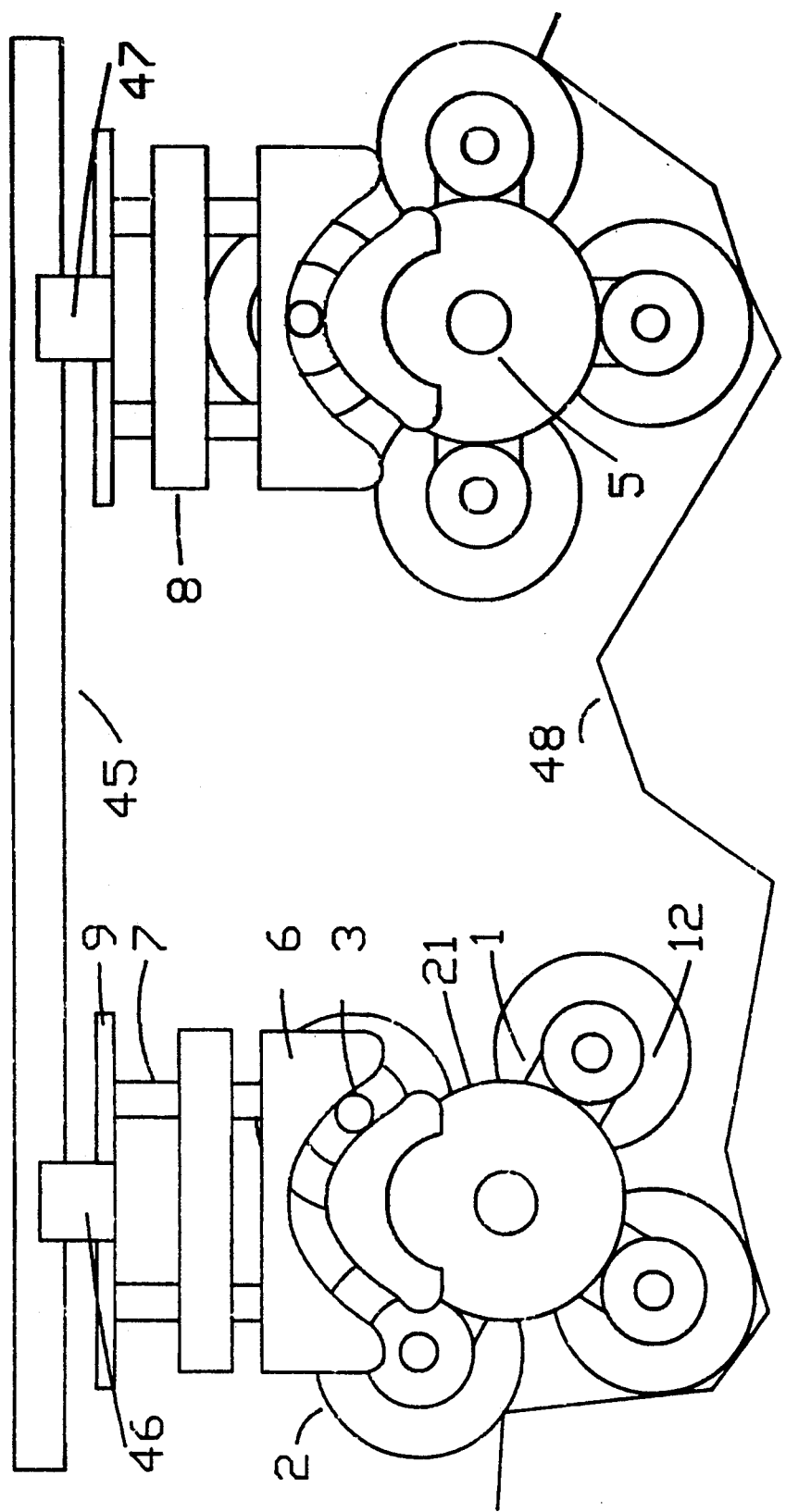
FIG. 4 is a schematic illustration of a side view of an all terrain small vehicle, having four suspension systems according to this invent-ion, with powered wheels and spoke systems.

FIG. 4 illustrates a side view of an all terrain powered small vehicle equipped with the suspension systems of FIG. 2 (bridging body parts 13 and 14 are removed for clarity) and moving on a rough path 48. In this implementation of the invention each of the wheels and the spoke systems is powered separately. The chasis of the vehicle 45 is connected to parts 9 by means of axes 46 and 47, which allow for all suspension systems steering.

When the vehicle cannot move by rolling of its wheels, as illustrated in FIG. 4 assuming an attempt to move to the left, the spoke system is rotated and the wheels roll around the obstacle. All the wheels are powered and braked together by means of the power wheel 21, transferring power to the wheels 2 by means of drive wheels 12.

FIG. 4 was drawn to the shown scale. In this drawing the wheels have a diameter of 24 cm and the distance between opposite rollers' centers is 40 cm. When this system moves on a smooth surface by rotation of the spokes, the vertical displacement of the spokes axis is more then 5.8 cm, but the vertical displacement of part 9, and with it the vehicle's displacement, is less then 0.5 cm, the small jump happens when a new roller is engaged in the cam body. With such a design this vehicle can drive over steps of 40 cm.

I claim:

1. A suspension system for vehicles comprising:
   a spoke system rotating in a vertical plane about an axis of rotation extending through a shaft located at a center of said spoke system;
   several rollers being mounted on the spoke system, all equidistantly from the center of the spoke system, and at a constant angle from each other with respect to the axis of rotation of the spoke system;
   a cam body including a cam path for guiding said rollers, when these pass on its, said cam body including sliding means for supporting the vehicle; and
   a bridging body including a bearing supporting said shaft of said spoke system so as to allow said spoke system to rotate, said bridging body including guiding means for guiding said sliding means of said cam body, said guiding means restraining said cam body to movement along a sliding direction, said sliding direction being radial relative to said axis of rotation and vertical with respect to the ground on which said vehicle is moving.

2. The suspension system of claim 1, wherein said cam body is designed to maintain a low degree of said vertical displacement of said cam body.

3. The suspension system of claim 1, further comprising:
   several wheels mounted on the spoke system, each of said wheels being rotatable about an axis of rotation through its center, all said wheels being mounted at the same distance from the center of the spoke system, all of said wheels being mounted around the spoke system with a same rotational symmetry as said rollers.

4. The suspension system of claim 3, said suspension system further comprising:
   drive wheel means connected to each said wheel for transferring power to each said wheel.

5. The suspension system of claim 4, said suspension system further comprises:
   power wheel means for transferring power to all of said drive wheel means.

* * * * *